(12) United States Patent
Dörr et al.

(10) Patent No.: US 12,139,143 B2
(45) Date of Patent: Nov. 12, 2024

(54) METHOD FOR CONTROLLING AN AUTOMATED VEHICLE

(71) Applicant: MERCEDES-BENZ GROUP AG, Stuttgart (DE)

(72) Inventors: Christoph Dörr, Stuttgart (DE); Falk Salzmann, Weil der stadt (DE); Stefan Sellhusen, Leonberg (DE); Roland Werner, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 84 days.

(21) Appl. No.: 18/034,786

(22) PCT Filed: Sep. 6, 2021

(86) PCT No.: PCT/EP2021/074490
§ 371 (c)(1),
(2) Date: May 1, 2023

(87) PCT Pub. No.: WO2022/089817
PCT Pub. Date: May 5, 2022

(65) Prior Publication Data
US 2023/0322225 A1  Oct. 12, 2023

(30) Foreign Application Priority Data

Nov. 2, 2020  (DE) ..................... 10 2020 006 696.8

(51) Int. Cl.
*B60W 30/18* (2012.01)
*B60W 60/00* (2020.01)

(52) U.S. Cl.
CPC .... *B60W 30/18159* (2020.02); *B60W 60/001* (2020.02); *B60W 2420/403* (2013.01);
(Continued)

(58) Field of Classification Search
CPC ..... B60W 30/18154; B60W 30/18159; B60W 2554/20; B60W 2554/40; B60W 2554/4045; B60W 2555/60
See application file for complete search history.

(56) References Cited

U.S. PATENT DOCUMENTS 9,442,489 B2    9/2016  Reichel et al.
2017/0158193 A1*  6/2017  Lopez ............. B60W 30/18154
(Continued)

FOREIGN PATENT DOCUMENTS

CN     105321362 A  *  2/2016
DE     102015219469 A1   4/2016
(Continued)

OTHER PUBLICATIONS

English Translation of CN-105321362-A.*
(Continued)

*Primary Examiner* — Anshul Sood
(74) *Attorney, Agent, or Firm* — PATENT PORTFOLIO BUILDERS PLLC

(57) ABSTRACT

A method for controlling an automated vehicle when driving into a crossing of equal-ranking roads involves the vehicle granting grants the further vehicles right of way at least for a pre-determined waiting time. The vehicle determines, according to a pre-determined arbitration rule, whether it should have priority over the further vehicles for passing through the crossing. After the waiting time has passed, the vehicle begins a crossing traversal maneuver to traverse the crossing if it is determined that it should have priority for passing through the crossing and if none of the further vehicles has driven on in the interim.

9 Claims, 1 Drawing Sheet

Figure 1:
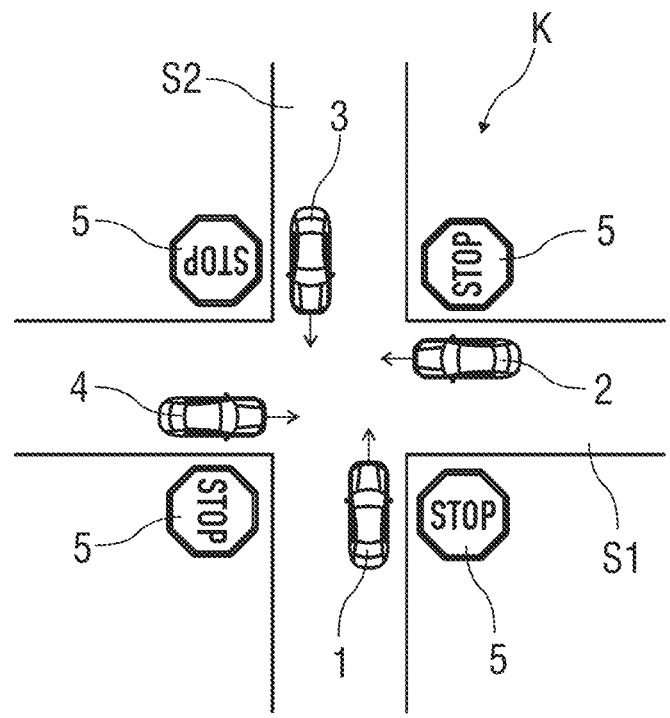

(52) U.S. Cl.
CPC ..... *B60W 2554/20* (2020.02); *B60W 2554/40* (2020.02); *B60W 2554/404* (2020.02); *B60W 2554/4045* (2020.02); *B60W 2555/60* (2020.02)

(56) References Cited

U.S. PATENT DOCUMENTS

| | | | |
|---|---|---|---|
| 2017/0249836 | A1 | 8/2017 | Laur et al. |
| 2019/0049961 | A1 | 2/2019 | Battles et al. |
| 2019/0272750 | A1* | 9/2019 | Fukumoto ............... G08G 1/09 |
| 2020/0307630 | A1 | 10/2020 | Ueda et al. |

FOREIGN PATENT DOCUMENTS

| | | |
|---|---|---|
| DE | 102019105739 A1 | 9/2020 |
| EP | 2911926 B1 | 9/2016 |
| JP | 2006338596 A | 12/2006 |
| JP | 2020166746 A | 10/2020 |
| SE | 1950882 A1 | 4/2020 |

OTHER PUBLICATIONS

International Search Report and Written Opinion mailed Jan. 5, 2022 in related/corresponding International Application No. PCT/EP2021/074490.
Office Action created May 26, 2021 in related/corresponding DE Application No. 10 2020 006 696.8.
Regele; "Using Ontology-based Traffic Models for more efficient Decision Making of Autonomous Vehicles;" Fourth International Conference on Autonomic and Autonomous Systems (ICAS'08); Mar. 16-21, 2008; DOI: 10.1109/ICAS.2008.10.
Office Action dated May 11, 2023 in related/corresponding KR Application No. 10-2023-7014892.
Notice of Reasons for Refusal mailed Mar. 12, 2024 in related/corresponding JP Application No. 2023-526682.

* cited by examiner

METHOD FOR CONTROLLING AN AUTOMATED VEHICLE

BACKGROUND AND SUMMARY OF THE INVENTION

Exemplary embodiments of the invention relate to a method for controlling an automated vehicle.

US 2020/0307630 A1 discloses a method for controlling an automated vehicle when driving into a crossing of equal-ranking roads. In the case of such a crossing, traffic situations can arise in which further vehicles reach the crossing at substantially the same time as the automated vehicle. In such a situation, all the vehicles are equally ranked with regards to traversing the crossing. If the automated vehicle recognizes such a situation, it is provided that it first grants the further vehicles right of way, and drives on after a pre-determined waiting time has passed, as long as none of the further vehicles has driven on before it.

DE 10 2019 105 739.6 describes a method for at least partially automated guidance of a motor vehicle. The method provides that proceeding control signals for controlling a transverse and/or longitudinal guide of the motor vehicle are generated and emitted to guide the motor vehicle in an at least partially automated manner, such that the motor vehicle proceeds into a road intersection. Environment signals are received that represent an environment of the motor vehicle while proceeding into the road intersection. Based on the environment signals, it is determined that the motor vehicle may proceed further into the road intersection, must stop, or reverse. Control signals to control the transverse and/or longitudinal guide are generated and emitted based on the determination to guide the motor vehicle corresponding to the determination in an at least partially automated manner such that the motor vehicle proceeds further into the road intersection, stops or reverses. A device, a motor vehicle, a computer program and a machine-legible storage medium are additionally described.

EP 2 911 926 B1 discloses a method for coordinating the operation of fully automated motor vehicles. Here it is provided that a trajectory described by at least one driver intervention is determined by the vehicle system of the motor vehicle for each motor vehicle from own information describing the state of the motor vehicle including a target position, and environment information describing the environment of the motor vehicle. It is additionally determined whether at least one coordination condition showing a necessary coordination is present via the vehicle system of the motor vehicle. If the coordination condition or at least one of the coordination conditions is present, trajectory data describing the trajectory is exchanged via a vehicle's own communication device of each motor vehicle via a communication connection. The trajectory data of the motor vehicles is checked for conflicts present due to spatial and chronological overlapping of trajectories of at least two of the motor vehicles and/or at least one of the motor vehicles not reaching the target position. If a conflict is present, then the trajectory of at least one motor vehicle involved in the conflict is evaluated and adjusted based on at least one arbitration device, and the respective adjusted trajectories are transmitted to the respective motor vehicles via the respective communication device. The driver interventions described by the respective trajectories are then carried out by the motor vehicle, wherein the driver interventions described by the respective adjusted trajectory are carried out by the respective motor vehicle whose trajectory was adjusted.

Exemplary embodiments of the invention are directed to a method for controlling an automated vehicle when driving into a crossing region.

In the method according to the invention for controlling an automated vehicle when driving into a crossing of equal-ranking roads, it is provided that the vehicle grants the further vehicles right of way at least for a pre-determined waiting time when it recognizes further equal-ranked vehicles at the crossing, determines, according to a pre-determined arbitration rule, whether it should have priority over the further vehicles for passing through the crossing and after the waiting time has passed, begins a crossing traversal maneuver to traverse the crossing if it has previously been determined that the vehicle should have priority for passing through the crossing and if none of the further vehicles has driven on in the interim, i.e., during the waiting time.

The method according to the invention thus provides that the vehicle decides whether it should have priority over the further vehicles at a crossing which equal-ranking further vehicles also intend to pass through. If this is the case, it begins to traverse the crossing, although not immediately, instead beginning only after the pre-determined waiting time, as long as none of the further vehicles has driven on during the waiting time.

By using the method, it is possible to resolve a traffic situation in the automated driving operation of the vehicle where right of way is unclear, in particular at a crossing of equal-ranking roads.

To resolve such a traffic situation, substantially no communication is required between the vehicles involved. As the automated vehicle then grants right of way to the further vehicles for the duration of the waiting time, observes their behavior during this time and decides whether it should drive on after the waiting time depending on the observed behavior and depending on prioritization adopted according to the arbitration rule, it is possible to observe such a traffic situation both with automated and with manually operated further vehicles.

An advantageous embodiment of the method provides that the vehicle proceeds slowly into the crossing when beginning the crossing traversal maneuver. The crossing traversal maneuver that has begun is advantageously continued as long as the further vehicles continue to wait, and thus grant one another right of way. If even one of the further vehicles no longer waits, and thus drives on, the crossing traversal maneuver is advantageously interrupted and the vehicle stops. The crossing traversal maneuver is advantageously re-started after a further waiting time from the interruption if the further vehicles wait again and thus grant one another right of way again in the interim.

As the vehicle continuously observes the behavior of the further vehicles when carrying out the crossing traversal maneuver, and thus observes whether the vehicles remain stationary or drive on, and as the vehicle interrupts the crossing traversal maneuver, and thus the proceeding movement depending on the observed behavior, it is of no significance whether the further vehicles are automated or manually operated. No communication device is thus required in the vehicle and in the further vehicles to coordinate with one another with regard to granting right of way. The crossing traversals of the vehicles are arbitrated using observation of the reaction of the further vehicles to the vehicle driving on and using the reaction of the vehicle to observed driving-on.

One embodiment of the method provides that the waiting time and/or the further waiting time is/are determined randomly or even pseudo-randomly. For this purpose, a timer is started if the vehicle is on a stop line. Here, the respective waiting time is selected such that a reaction of the further vehicles, in particular if they are operated manually, is possible, and which can be detected by means of the sensors in the vehicle. This means the respective waiting time is selected such that the further vehicles have enough time available to carry out a reaction that can be recorded by means of sensors. The waiting time and the further waiting time can in particular also be equal.

In a development of the method, the arbitration rule provides that priority for passing through the crossing is decided using vehicle number plates of the vehicle and the further vehicles. The arbitration rule is advantageously based on an agreement made across all manufacturers, such that all the vehicles use the same arbitration rule.

The arbitration rule in particular provides that a hashing value is respectively determined from the characters of the vehicle number plates by means of a hashing function and priority is determined corresponding to a sorting sequence of the hashing values.

In a possible development, a value is assigned to numerals and/or letters located on a vehicle number plate, wherein a sum of the values is determined per vehicle number plate and priority for passing through the crossing is assigned to the vehicles one after the other in a sequence from the smallest sum to the largest sum. The conflict in relation to who should pass through the crossing first can thus be solved.

In a further embodiment, behavior of the further vehicles at the crossing is determined using recorded signals of an environment sensor of the vehicle. The behavior of the further vehicles is, in particular, determined using recorded image data of at least one vehicle camera as a component of the environment sensor. It can thus be detected that one of the further vehicles is driving on, for example, wherein this can also be recorded using a determined spacing change between the vehicle and the further vehicles.

In a development of the method, the vehicle number plates of the further vehicles are determined using recorded image signals of a vehicle camera of the vehicle, wherein the vehicle number plate of the vehicle is stored in a memory unit in the vehicle. It is thus comparatively easy to carry out the hashing function for determining a respective hashing value to determine which vehicle can pass through the crossing first.

If the vehicle number plate of a vehicle cannot be recognized, or cannot be unambiguously recognized, a vehicle number plate is advantageously assigned to this vehicle that is randomly generated, in particular randomly selected from a list of pre-determined number plates.

Exemplary embodiments of the invention are explained in more detail in the following with reference to the drawings.

BRIEF DESCRIPTION OF THE DRAWING FIGURES

In the figures:

FIG. 1 schematically shows a crossing of equal-ranking roads and a corresponding number of vehicles.

Figure 2:
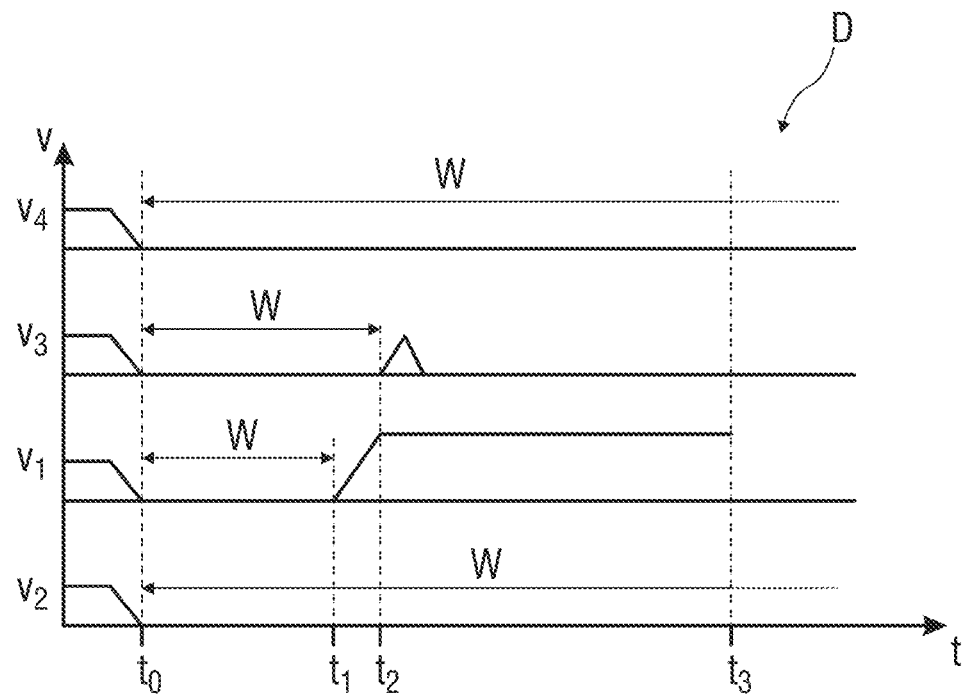

FIG. 2 schematically shows a time speed diagram.

Parts corresponding to one another are provided with the same reference numerals in all figures.

DETAILED DESCRIPTION

FIG. 1 shows a crossing K, at which two equal-ranking roads S1, S2 cross, wherein a vehicle 1 to 4 is located on each portion of road leading to the crossing K.

All the vehicles 1 to 4 shown in FIG. 1 are moved in the automated driving operation, wherein no passenger is in the vehicle 1 to 4 in some circumstances.

If all the vehicles 1 to 4 are moved in the manual driving operation, then in such a traffic situation as shown in FIG. 1, the need results for the vehicle users to communicate with one another to determine which of the vehicles 1 to 4 passes through the crossing K first.

According to the present exemplary embodiment, all the vehicles 1 to 4 are driving in the automated driving operation, wherein no passenger is in the respective vehicle 1 to 4 in some instances who can communicate with a passenger of one of the vehicles 1 to 4.

One stop sign 5 is respectively located on all the portions of road leading into the crossing K in FIG. 1, in particular as is usual in the USA, such that all the vehicles 1 to 4 have to stop. A right of way regulation then applies to the effect that the vehicle 1 to 4 that stopped first can pass through the crossing K first. If several vehicles 1 to 4 stop at the crossing K at the same time, then a right before left regulation applies, and/or it is required that the vehicle users agree.

In the following, a method is described representing a solution in such a traffic situation at a crossing K having two equal-ranking roads S1, S2 and four automated vehicles 1 to 4.

In FIG. 2, a time speed diagram is depicted in which four velocity curves $V_1$ to $V_4$ are depicted in relation to the time t, which are assigned to the vehicles 1 to 4 located at the crossing K.

At a point in time to, all the vehicles 1 to 4 reach the crossing K and recognize the conflict of who can pass through the crossing K first. At this point in time to, all the vehicles 1 to 4 are waiting at a stop line, and respectively start a timer having a random or pseudo-random running time, in particular waiting time W.

In the present exemplary embodiment, the waiting time W of a vehicle 1 has elapsed at a first point in time t1, whereupon the vehicle 1 begins a bend traversal maneuver, in which it then proceeds into the crossing K. A first further vehicle 2 and a second further vehicle 3 recognize this proceeding movement of the vehicle 1 and continue to wait.

A random waiting time of a third further vehicle 4 has elapsed at a second point in time $t_2$.

If the third further vehicle 4 recognizes the vehicle 1 proceeding, a proceeding movement of the third further vehicle 4, which proceeds into the crossing K after its random or pseudo-random waiting time W has elapsed, is interrupted.

If the further vehicle 1 and the second further vehicle 3 respectively recognize the proceeding movement of the respective other vehicle, the vehicle 1 and the second further vehicle 3 interrupt their proceeding movement and the process begins again as if at the point in time to.

According to the exemplary embodiment, in FIG. 2, the vehicle 1 passes through and leaves the crossing at a third point $t_3$.

If the now prevailing traffic situation with the further vehicles 2 to 4 is not resolved due to locally applicable traffic regulations, then the arbitration begins again with the remaining three further vehicles 2 to 4.

The respective proceeding movement and/or further behavior of the vehicles 1 to 4 is/are in particular recorded using recorded signals and/or recorded image signals of recording units of an environment sensor of the respective vehicle 1 to 4.

In the present method, an arbitration occurs according to a pre-determined arbitration rule, in which it is determined by evaluating unambiguous features of the vehicles, for example by evaluating their vehicle number plates, which of the vehicles 1 to 4 should have priority over the other vehicles 1 to 4 when traversing the crossing K. The vehicle 1 begins its bend traversal maneuver after the waiting time runs out only if it is determined according to the arbitration regulation that it should have priority over the further vehicles 2 to 4.

This possibly of the arbitration is based in particular on a shared arbitration regulation agreed by all manufacturers. All the vehicles 1 to 4 then use the same arbitration regulation to determine priority.

For example, the arbitration rule provides that a series of characters, for example a numerical value, is respectively assigned to the vehicle number plate of the vehicles 1 to 4, and that the priority of this series of characters is determined according to an undertaken sorting. The series of characters assigned to the respective vehicle number plate is in particular determined from the characters of the respective vehicle number plate by means of a hashing function, e.g., Message-Digest 5. The hashing values determined by means of the hashing function are compared with one another, wherein the vehicle is identified with the vehicle number plate, for example, to which the smallest hashing value is assigned, and wherein it is determined that this vehicle should have priority over the other vehicles.

The vehicle number plates of the vehicles 1 to 4 are, in particular, recorded using recorded image data of a vehicle camera of an environment sensor of the respective vehicle 1 to 4, wherein the own vehicle number plate and/or its hashing value is/are stored in the vehicle.

As an alternative to the hashing function, the assignment of a numerical value to a vehicle number plate can also occur by a value respectively being assigned to the numbers and/or letters located on the vehicle number plate, and the sum of the values per vehicle number plate being determined.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling an automated vehicle when driving into a crossing of equal-ranking roads, wherein the automated vehicle grants further vehicles right of way at least for a pre-determined waiting time when the automated vehicle recognizes further equal-ranked vehicles at the crossing, the method comprising:

determining, by the automated vehicle and according to a pre-determined arbitration rule that assigns a priority to the automated vehicle and the further equal-ranked vehicles based on unambiguous features of the automated and further equal-ranked vehicles, whether the automated vehicle should have priority over the further equal-ranked vehicles for passing through the crossing; and after the waiting time has passed, the automated vehicle begins a crossing traversal maneuver to traverse the crossing if it is determined, by comparing the priority assigned to the automated vehicle to the priorities respectively assigned to the further equal-ranked vehicles, that the automated vehicle should have priority for passing through the crossing, and if none of the further equal-ranked vehicles has driven on in an interim.

2. The method of claim 1, wherein the automated vehicle continues the crossing traversal maneuver as long as the further equal-ranked vehicles continue to wait.

3. The method of claim 1, wherein the automated vehicle interrupts the crossing traversal maneuver and stops if at least one of the further equal-ranked vehicles no longer waits.

4. The method of claim 3, wherein the automated vehicle restarts the crossing traversal maneuver after a further waiting time from the interruption if the further equal-ranked vehicles wait again.

5. The method of claim 4, wherein the waiting time or the further waiting time are randomly or pseudo-randomly pre-determined.

6. The method of claim 1, wherein the unambiguous features of the automated vehicle and the further equal-ranked vehicles is vehicle number plates of the automated vehicle and the further equal-ranked vehicles.

7. The method of claim 6, wherein a hashing value is respectively determined from the vehicle number plates by a hashing function and priority is determined corresponding to a sorting sequence of the hashing values determined from the vehicle number plates.

8. The method of claim 6, wherein a value is assigned to numerals or letters located on a vehicle number plate, wherein a sum of values is determined per vehicle number plate and priority for passing through the crossing is assigned to the automated vehicle and the further equal-ranked vehicles one after the other in a sequence from a smallest of the sum of values to a largest of the sum of values.

9. The method of claim 6, wherein the vehicle number plates of the further equal-ranked vehicles are determined using recorded image signals of a vehicle camera of an environment sensor of the automated vehicle, wherein the vehicle number plate of the automated vehicle is stored in a memory unit in the automated vehicle.

* * * * *